United States Patent Office 2,724,935
Patented Nov. 29, 1955

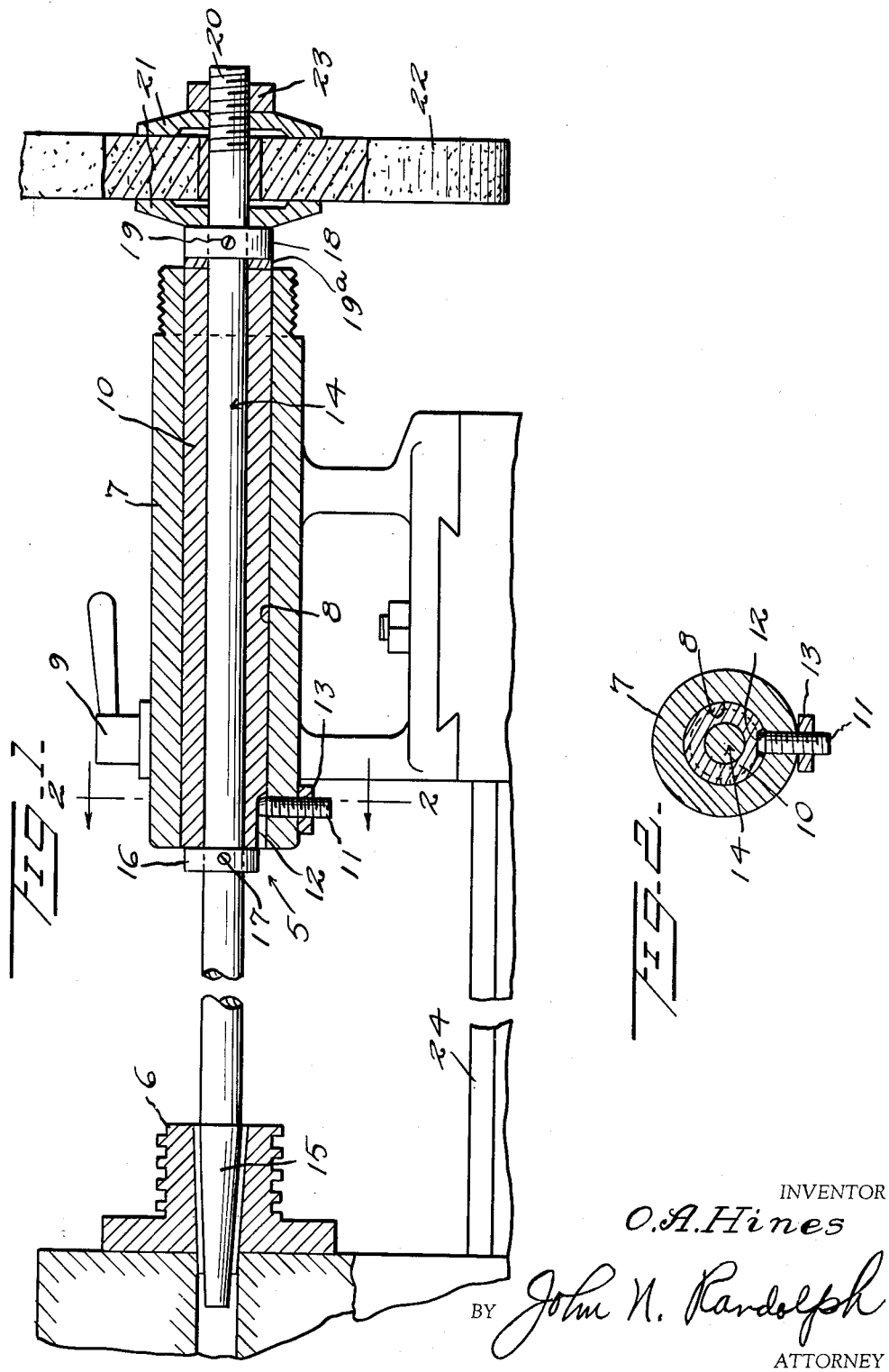

2,724,935

LATHE ATTACHMENT

Orville A. Hines, Gary, Ind.

Application March 24, 1954, Serial No. 418,375

1 Claim. (Cl. 51—166)

This invention relates to a novel attachment for lathes and whereby a lathe equipped with the attachment may be used for supporting grinding wheels, faceplates, sanding disks and the like and for rotating such elements through the lathe and from the power source of the lathe.

More particularly, it is an aim of the present invention to provide an attachment permitting rotation of grinding wheels, sanding disks, faceplates and the like which require greater radial clearance than is provided over the lathe bed.

Another object of the invention is to provide an attachment which will locate grinding wheels and sanding disks beyond the outer end of the lathe tailstock to prevent accumulation of grit or other foreign matter on the lathe bed.

Various other objects and advantages of the invention will hereinafter become more fully apparent from the following description of the drawing, illustrating a presently preferred embodiment thereof, and wherein:

Figure 1 is a fragmentary longitudinal sectional view, partly in side elevation, showing a portion of a conventional lathe equipped with the attachment comprising the invention, and Figure 2 is a cross sectional view through the lathe tailstock taken substantially along a plane as indicated by the line 2—2 of Figure 1.

Referring more specifically to the drawing, for the purpose of illustrating the application and use of the lathe attachment, designated generally 5 and comprising the invention, a portion of a conventional lathe has been shown including a lathe headstock chuck 6, a tailstock 7 having a bore 8 from which a tailstock spindle, not shown, has been removed, and a tailstock spindle clamp 9.

The attachment 5 comprising the invention and which is utilized with the conventional lathe parts 6 to 9, inclusive, includes an elongated bearing or bushing 10 which is preferably formed of bronze and which is disposed in the bore 8 of the tailstock 7 and secured by tightening the tailstock clamp 9. The bearing or bushing 10 may be additionally retained by a screw 11 which is threaded radially through a portion of the tailstock, near its inner end, into the bore 8 and which engages a longitudinal groove 12 in the bearing or bushing 10. Said retaining screw 11 is preferably provided with a retaining nut 13.

A shaft 14, constituting a part of the attachment 5, is journalled in the bearing or bushing 10 and extends from the ends thereof. The shaft 14 has a tapered inner end 15 which is shaped to correctly fit the taper of the headstock chuck 6. A collar 16 is carried by the shaft 14 between its tapered end 15 and the bearing 10 and said collar is secured against the inner end of the bearing 10 by a radial setscrew 17, carried by said collar and which is secured to the shaft 14, to hold the tapered shaft end 15 seated in the chuck 6 for rotation of the shaft with the chuck.

A similar collar 18 is adjustably secured on the shaft 14, beyond the opposite outer end of the bearing 10 and tailstock 7, by a setscrew 19 which is threaded radially into the collar 18 and against the shaft 14. A washer 19a may be disposed on the shaft 14 between the collar 18 and the outer end of the bearing 10.

The outer end 20 of the shaft 14 is threaded at a point beyond and spaced from the collar 18. Outwardly with respect to the collar 18, the shaft 14 is adapted to carry a pair of clamping plates 21 which may engage opposite sides of a grinding wheel 22, for example, which is mounted on the outer portion of the shaft 14. A nut 23 is carried detachably by the outer threaded shaft end 20 and the clamping plates 21 and grinding wheel 22 are disposed between the collar 18 and nut 23. Accordingly, by tightening the nut 23, the grinding wheel 22 will be clamped between the plates 21 and said plates will in turn be clamped between the collar 18 and nut 23 so that the grinding wheel 22 will be rotated with the shaft 14.

It will be obvious that a faceplate, sanding disk or other item to be revolved may be substituted for the grinding wheel 22 as illustrated.

From the foregoing it will be readily apparent that when the headstock chuck 6 is rotated in a conventional manner that the shaft 14 will revolve therewith in the bearing 10 for rotating the member 22 therewith. The member 22 when thus rotated may be employed in a conventional manner. It will be obvious that the member 22 or other elements substituted therefor may be employed with the attachment 5 and which are too large in diameter to be mounted for rotation by the lathe above the lathe bed 24. It will likewise be apparent that grit or the like from the wheel 22 will be discharged beyond an end of the lathe and not onto the lathe bed.

Obviously, elements to be turned and constituting workpieces on which a machining operation, for example, is to be performed, may be supported in the same manner as the wheel 22 and which are too large to be mounted for rotation by the lathe between its headstock and tailstock. It will also be noted that the attachment 5 supports the rotated element which is held between the clamping plates 21 in a more accessible position for use or to be worked on than if the element was disposed above the lathe bed 24 between the headstock and tailstock.

Various modifications and changes are contemplated and may obviously be resorted to, without departing from the spirit or scope of the invention as hereinafter defined by the appended claim.

I claim as my invention:

A lathe attachment of the character described comprising an elongated bearing forming a lathe tailstock spindle replacer adapted to be disposed in a spindle receiving bore of a lathe tailstock, said bearing having an external groove opening outwardly of one end thereof, a retaining screw threaded radially into the tailstock near one end thereof and engaging in said groove for detachably securing the bearing immovably in the tailstock, a shaft having a portion spaced from the ends thereof extending through and journaled in said bearing, said shaft having a tapered inner end adapted to be detachably secured in the headstock chuck of the lathe and whereby said shaft is revolved with the headstock, said shaft having an outer end disposed beyond an outer end of said bearing and the tailstock, collars disposed on said shaft and abutting against the ends of said bearing, means adjustably securing said collars to the shaft for maintaining the shaft against sliding movement in the bearing and to retain the inner end of the shaft in a seated position in the headstock chuck, clamping plates mounted on the outer end portion of said shaft, said outer end portion of the shaft having a threaded terminal portion disposed beyond said clamping plates, means to be revolved by said shaft mounted thereon between said clamping plates, and a nut engaging said threaded terminal portion, said nut cooperating with the adjacently disposed collar for retaining said clamping plates in clamping engagement with the means to be revolved whereby said means is rotated with the shaft.

References Cited in the file of this patent

UNITED STATES PATENTS

| | | |
|---|---|---|
| 264,726 | Maltby | Sept. 19, 1882 |
| 989,203 | Stebbins | Apr. 11, 1911 |
| 1,254,900 | Guillet | Jan. 29, 1918 |
| 2,475,235 | Goodwin | July 5, 1949 |
| 2,599,698 | Dall | June 10, 1952 |
| 2,629,210 | Robinson | Feb. 24, 1953 |

FOREIGN PATENTS

| | | |
|---|---|---|
| 25,046 | Denmark | Sept. 11, 1919 |